United States Patent [19]

Imparato

[11] Patent Number: 5,454,895
[45] Date of Patent: Oct. 3, 1995

[54] PROCESS FOR MANUFACTURING FIBER REINFORCED STRUCTURES SUITABLE FOR AERONAUTIC APPLICATIONS

[75] Inventor: Sabato I. Imparato, Gragnano, Italy

[73] Assignee: Finmeccanica S.P.A. - Ramo Aziendale Alenia, Rome, Italy

[21] Appl. No.: 99,922

[22] Filed: Aug. 3, 1993

[30] Foreign Application Priority Data

Aug. 3, 1992 [IT] Italy .................................. RM92A0590

[51] Int. Cl.⁶ ...................................................... B32B 31/20
[52] U.S. Cl. ........................ 156/156; 156/189; 156/285; 156/286; 264/510; 264/545; 264/546; 425/389
[58] Field of Search .................................. 156/285, 286, 156/156, 189, 191, 382, 245, 292, 580, 583.1; 264/510, 511, 520, 545, 546; 425/388, 389; 244/143

[56] References Cited

U.S. PATENT DOCUMENTS

| | | | |
|---|---|---|---|
| 2,838,435 | 6/1958 | Hewett | 156/285 X |
| 3,493,240 | 2/1970 | Jenks | 156/156 X |
| 3,553,054 | 1/1971 | Maus | 156/286 X |
| 3,795,559 | 3/1974 | Horn et al. | 156/191 X |
| 4,311,661 | 1/1982 | Palmer | 264/510 |
| 5,084,120 | 1/1992 | Fischer et al. | 156/285 X |

*Primary Examiner*—Michele K. Yoder
*Attorney, Agent, or Firm*—Herbert Dubno

[57] ABSTRACT

Equipment and method for manufacturing integral monolithic structures, using reinforcing fiber layers impregnated with thermosetting resins. The apparatus has an equipment base, which determines the shape of the structure, a cover of the equipment, two side supports enclosed by an outer bag of nylon or similar material and by as many supporting elements as the number of bays required breathing material; a sheet of parting film, sealing mastic, vacuum application valves, a tubular parting film and tubular bags. The invention simplifies the manufacturing process and is particularly important in the aeronautical field and wherever there is a need for very low weight, high structural efficiency and high quality standards.

4 Claims, 7 Drawing Sheets

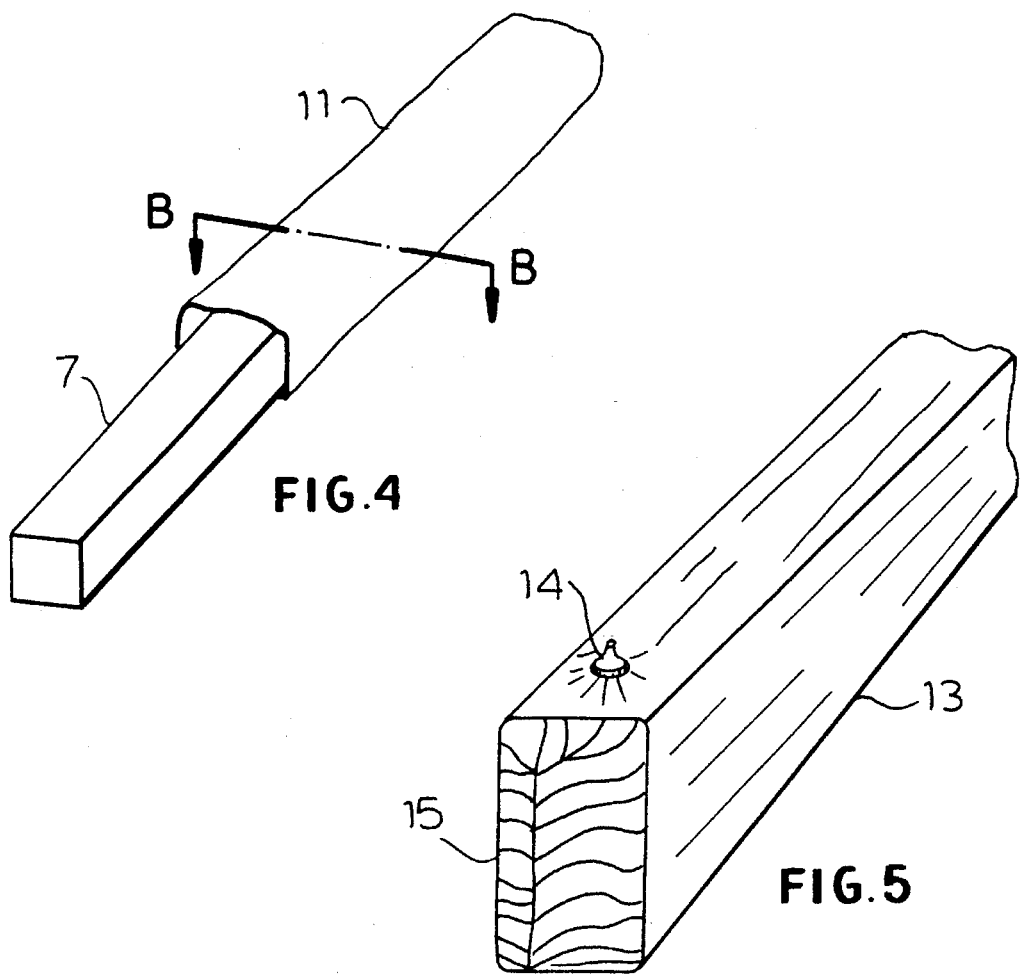
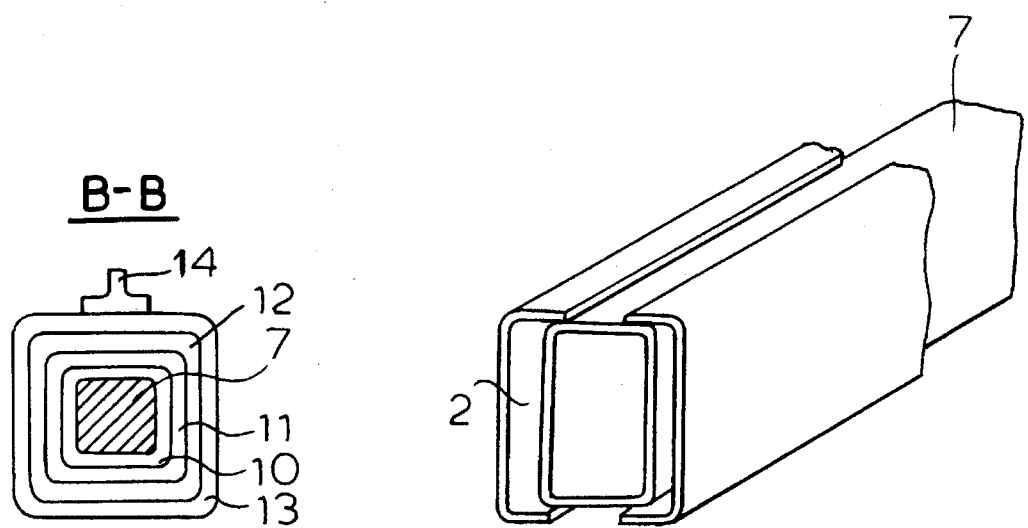

PROCESS FOR MANUFACTURING FIBER REINFORCED STRUCTURES SUITABLE FOR AERONAUTIC APPLICATIONS

FIELD OF THE INVENTION

The present invention relates to an apparatus and process for manufacturing of integral monolithic structures, utilizing reinforcing layers of fibers pre-impregnated with thermosetting resins. More particularly this invention relates to an apparatus which comprises of two half shells held together by an outer bag made of nylon or similar material, as many supporting elements (a support is an element which provides support and position for the pre-formed core of the structure) as required by the number of cavities to be manufactured, a venting material, a sheet of parting film, mastic, valves through which a vacuum can be formed, tubular parting film and tubular bags.

The invention is intended to simplify the manufacturing process and is particularly advantageous in the field of aeronautical, naval, and rail constructions; stand structures; military field equipment (bridges, roads); medical equipment structures, the automotive industry and wherever there is a requirement for low weight, high structural efficiency and high quality standards.

BACKGROUND OF THE INVENTION

It is a known fact that aircraft require materials and structures which have to be lightweight and strong at the same time.

For the manufacturing of such structures, the use of composite materials with a thermosetting matrix has become widely popular.

In particular, integral composite structures have proved to be very efficient.

The manufacturing of this type of structure required equipment and procedures with such drawbacks as to lead me to search for and then find a solution which is original in terms of equipment and process.

In recent years, a technique for the manufacturing of thermosetting composite structural parts has been commonly adopted. This manufacturing method consists in forming layers of carbon fibers, glass fibers, etc., pre-impregnated with thermosetting resins, using a forming or shaping tool.

To tighten the layers and to confer the required shape, the layers were enclosed between the surface of the shaping tool and an external flexible container, known as a vacuum bag.

The adoption of composite structural parts for aeronautical and other applications gives rise to major benefits in terms of manufacturing cost savings and quality improvements, due to the possibility to manufacture integral box structures, in one shot, even with strengthening elements, spars, or the like which join the two surfaces of the structure. This manufacturing process was, until now performed with complex layer-forming equipment, which was often expensive to manufacture and required long heating times for polymerization, while not ensuring a uniform distribution of pressure over the entire surface during the polymerization process.

Uniform application of pressure is therefore the most significant problem with earlier techniques.

OBJECTS OF THE INVENTION

It is, therefore, the principal object of the present invention to provide an improved apparatus for producing integrated fiber-reinforced synthetic resin structures, i.e. integral composite structures, which avoids the drawbacks of earlier manufacturing equipment for such structures.

It is also an object of this invention to provide an improved method of or process for making integral composite structures at reduced cost and of higher quality than has hitherto been the case.

It is also an object of this invention to provide a method of and an apparatus for producing integral composite structures which can insure a uniform distribution of pressure over the entire surface during the polymerization process.

Still another object of my invention is to provide a system for producing integral composite structures which avoids the drawbacks of earlier systems.

SUMMARY OF THE INVENTION

These objects and others which will become apparent hereinafter, according to the invention, are attained by applying to each of a number of supporting elements, a layer of parting film and then with a tubular bag, wrapping each supporting element and the tubular bag with a breathing material and fixing the edges thereof with adhesive tape, then applying a tubular parting film to each supporting element, sealing the film and applying a vacuum forming valve to the sealed film.

A vacuum is then applied and the tubular film compresses all of the elements within it onto the supporting element. On each supporting element preformed spars of preimpregnated filler material are mounted and preimpregnated fiber material is positioned on each plate of the forming tool within which the assembly of supporting elements and spars is positioned. The entire assembly of preimpregnated material, supporting elements and spars is then covered with parting film sheets and with breathing material. The latter assembly can be covered with a bag film and the resulting bag is evacuated to tighten the bag material onto the external surface of the forming tool. Prior to the latter step, the ends of the tubular sacks can be opened, bonded to the external bag structure which can be evacuated and the resulting assembly polymerized in an autoclave or oven.

This invention, therefore, provides a system which can apply distributed pressure over the box structure, while consisting of an upper and lower plate and lateral supports for predictable and uniform manufacturing of these elements in carbon fiber or similar materials.

The invention provides a simplified system in terms of manufacturing facilities, mostly due to the elimination of rigid or semi-rigid elements which were used by the previous techniques and which could not assure uniform application of pressure to the layers of carbon fiber during the process.

BRIEF DESCRIPTION OF THE DRAWING

The above and other objects, features and advantages of the invention will become more readily apparent from the following description, reference being made to the accompanying highly diagrammatic drawing in which:

FIG. 4 is a diagrammatic perspective view of a supporting element provided with a tubular bag;

FIG. 5 is a perspective view of the tubular bag with its end sealed and provided with a valve enabling evacuation thereof;

FIG. 6 is a section taken along the line B—B of FIG. 4 through the tubular bag and the supporting element;

FIG. 7 is a perspective view diagrammatically showing the position of semi-spars used in the system of the invention;

SPECIFIC DESCRIPTION

Figure 1:
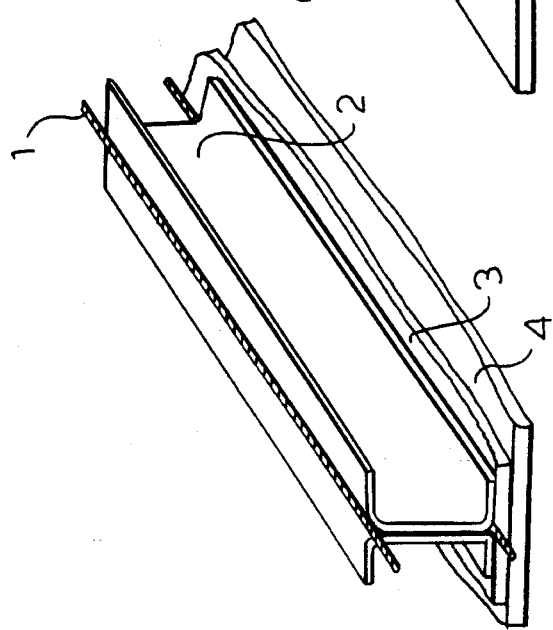
FIG. 1 is a perspective view, partly broken away, of a preformed spar for use in accordance with the invention.

FIG. 1 shows a preformed spar which includes fillers 1, two preformed semi-spars two disposed back to back, a lower preplied skin 3 upon which the semi-spars 2 rest and a tool base plate 4 upon which the lower preplied skin 3 is disposed.

Figure 2:
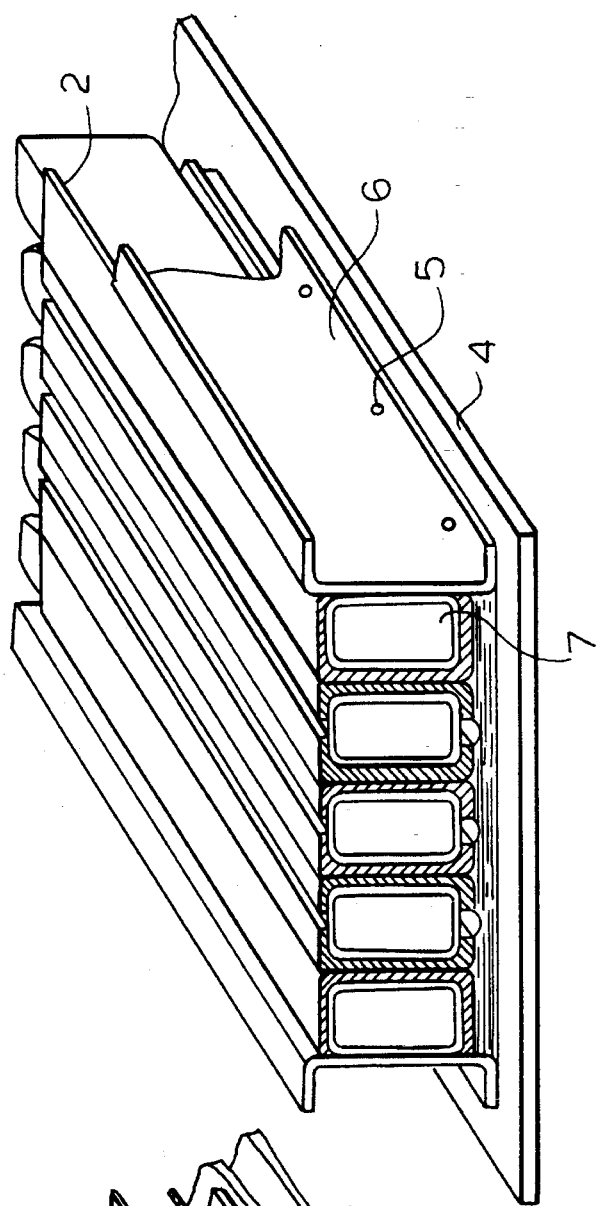
FIG. 2 is a perspective view partly in cross section and partly broken away schematically showing the auxiliary supports on a forming tool base plate.

As can be seen from FIG. 2, these supporting elements can be provided on the tool auxiliary plates in an apparatus which can comprise elements 5 fixing the side plates 6, which can also be semi-spars, and supporting elements 7 between these side plates, each of which can be composed of a plurality of semi-spars of the type illustrated in FIG. 1.

Figure 3:
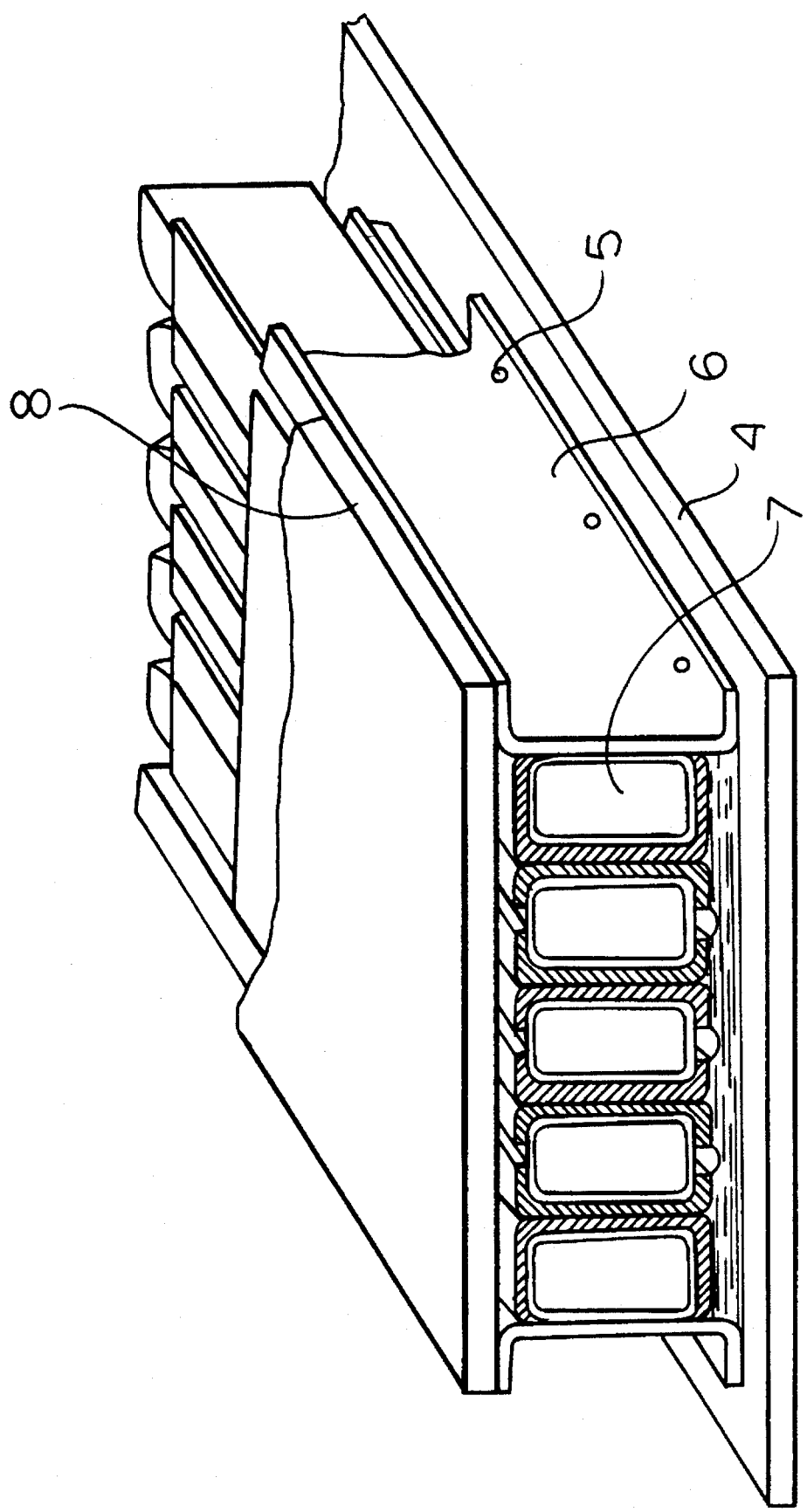
FIG. 3 is a perspective view partly in section and partly broken away of the forming tool with supporting elements.

From FIG. 3, it will be apparent that the forming tool as a whole can comprise the forming tool base plate 4 upon which the supporting elements 7 are provided, flanked by the lateral systems 6 which can be fixed by fixing elements 5. The upper closing cover of the tool is shown at 8.

From FIG. 4 it will be apparent that the supporting element 7 can be enclosed in a tubular bag 11 to provide an assembly shown in FIGS. 5 and 6 in greater detail, FIG. 5 representing a tubular bag 11 which is sealed at an end by sealing means diagrammatically represented at 15 and is provided with a vacuum application valve 14.

From FIG. 6, it will be apparent that, in addition to the supporting element 7, the assembly enclosed in the tubular bag 11 can be provided with a film 10 as an internal separated and surrounded by a layer 12 of breathing material and then a layer 13 of external parting film.

The preformed semi-spars 2 can also flank the supporting element 7 covered by the layers shown in FIG. 6 before this subassembly is applied to the forming tool base played 4.

Figure 8:
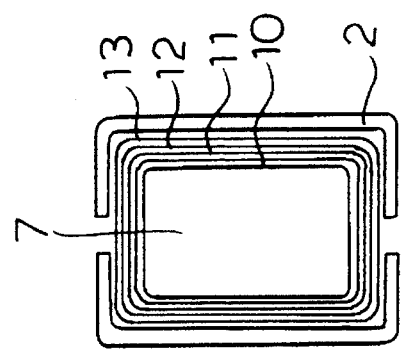
FIG. 8 is a section through a parting element with the semi-spars in position.

Turning to FIG. 8, it will be apparent that the subassembly, when the C-section preformed semi-spars are in position, can include the two preformed semi-spars 2 reaching toward one another and enclosing the supporting element 7, around which a layer 10 of parting film is applied and which is followed by the tubular bag 11, then the layer 12 of breathing material and the parting film 13.

Figures 9, 9A:
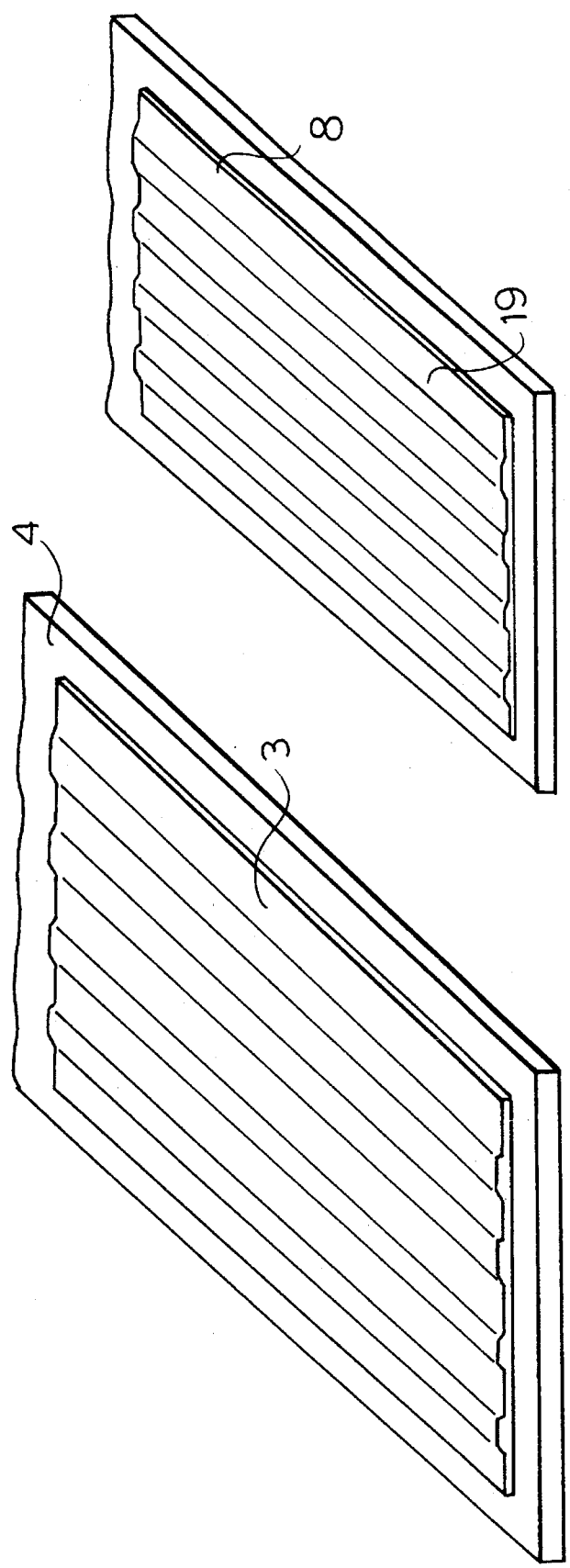
FIG. 9 is a perspective view showing the lower closing lid of the tool.
FIG. 9A is a perspective view showing the upper closing lid of the tool.

On the lower plate 4 of the forming tool (FIG. 9) a lower closing skin 3 is applied while an upper closing skin 19 is applied to the upper plate 8 of the forming tool (FIG. 9A).

Figure 10:
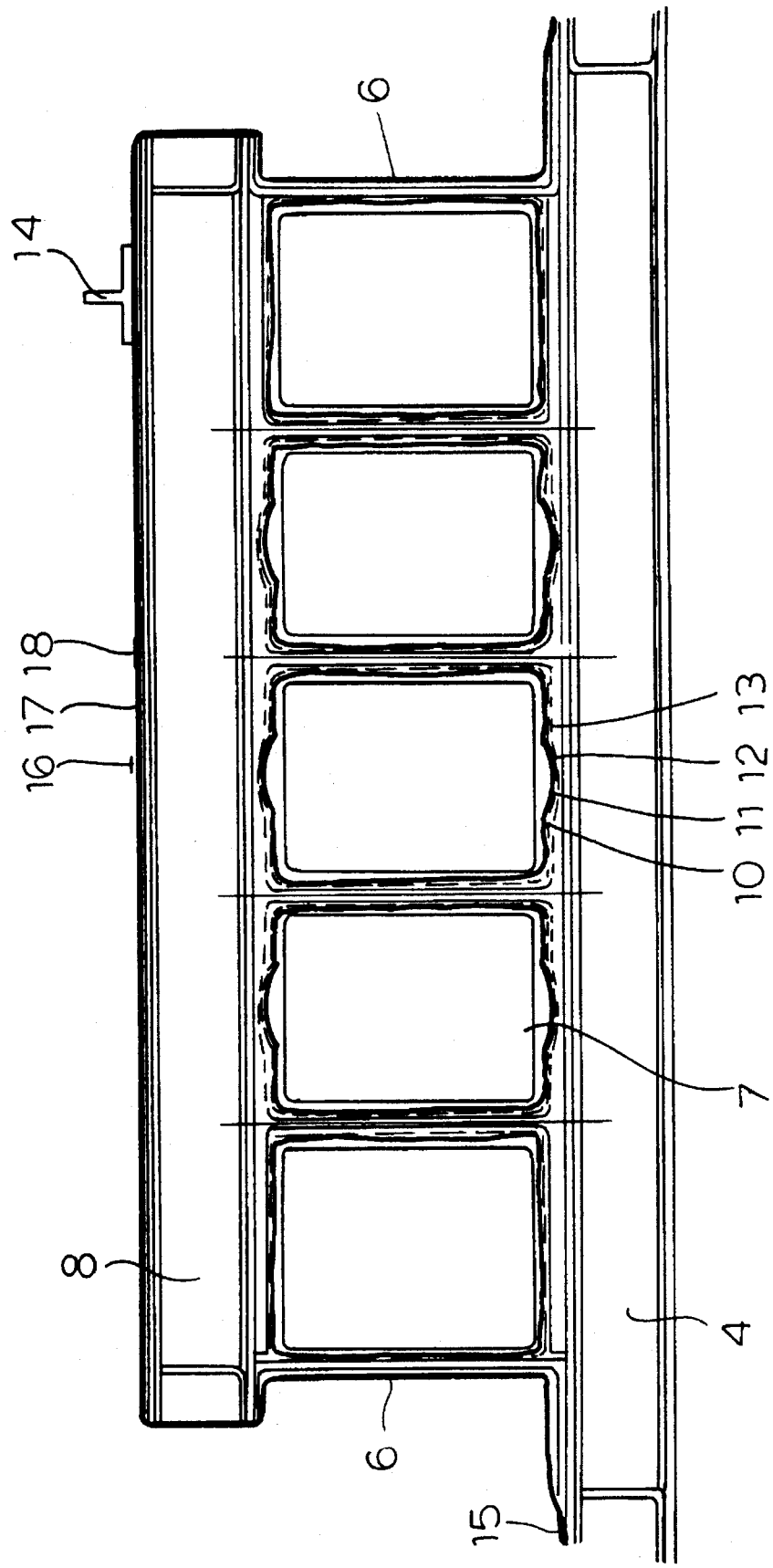
FIG. 10 is a view partially in elevation and partially in section showing the assembly of the bag to the structure.

FIG. 10 shows the final bag assembly and comprises the lower plate 4, the upper plate 8 and between the upper plate and the lower plate, the pair of shoulders 6 which then enclose the subassemblies including the supporting elements 7 flanked by the respective pairs of spars 2 which are not independently visible in FIG. 10, and each of which includes the parting film 10, the tubular bag 11, the breathing material 12 and the parting film 13.

In FIG. 10, the elements of the external bag are shown as including a parting film 18 inwardly of the film bag material 16 and a breathing material 17 between the film bag material 16 and the parting film 18. At 15, the bag material is sealed, e.g. to the base plate 4 so that a complete bag is formed by the bag material 16 and can be provided with the vacuum valve 14 shown highly diagrammatically.

The invention will now be described for illustrative nonlimiting purposes with reference to the FIGS. described. The manufacturing of boxed structures with strengthening elements in a single cycle requires the availability of the following materials, tools and facilities:

a roll of pre-impregnated polymeric matrix material reinforced with fibers of various nature such as carbon, Aramide, glass and similar;

auxiliary materials to build the vacuum bag;

controlled environment in terms of temperature, humidity and dust content; and an autoclave, consisting of a closed vessel in which a temperature and pressure cycle can be performed.

The following describes the best mode of practicing the invention currently known to me.

In fact the system and procedure may be implemented by inverting some actions and/or materials without losing their initial characterization.

First, prepare the material by removing it from the refrigerator where it is kept at a low temperature, about −20° C. and leave it in the open until no more dew (condensate) forms on the outer protective envelope, i.e. when it has reached ambient temperature.

Cut and shape the impregnated material according to the directions and quantities required by the design.

The tools are prepared by applying a parting agent either as a film or spray film or teflon or the like.

The procedure to be followed then consists of the following operations:

(a) Dress each auxiliary support 7 with a layer of separator 10 to facilitate its removal at a later date and then with a tubular bag 11 leaving about half a meter excess on each side for the sealing operation also to follow.

(b) Wrap each supporting element 7, over the tubular bag 11, with breathing material 12 and fix its ends with suitable sealant.

(c) Dress each supporting element 7, over separator 10, tubular bag 11, breathing material 12, with parting tubular film 13, leaving at least half a meter excess on each side for the next sealing operation.

(d) Seal the end of each tubular film using sealing agent 15 and apply a valve 14 to each end to create a vacuum.

(e) Apply a vacuum and wait for the tubular separator film 13 to tighten around supporting element 7.

Figure 12:
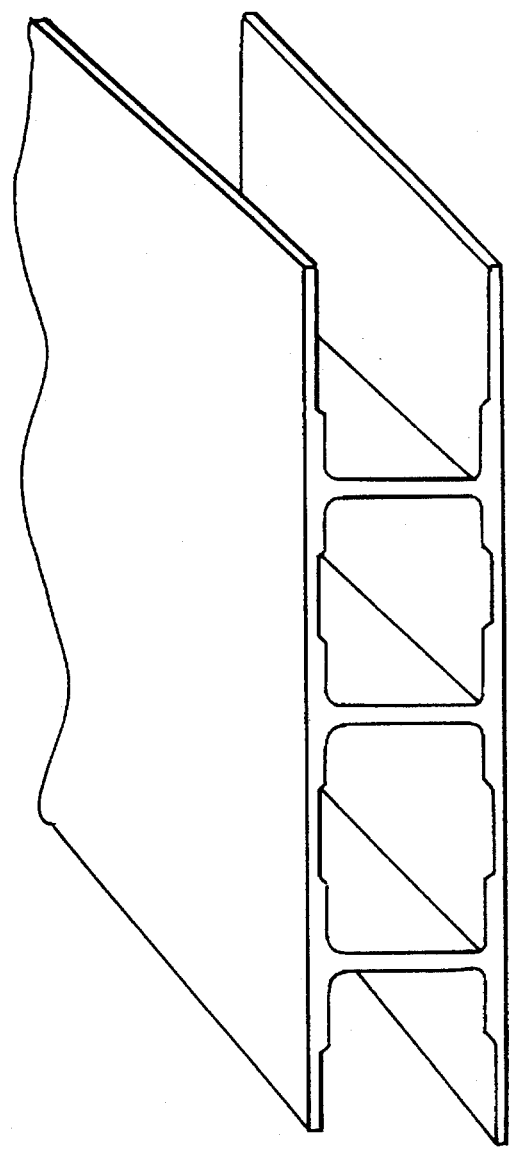
FIG. 12 is a perspective view showing the box structure with reinforcing elements or spars upon completion.

(f) Over each of the supporting elements prepared according to steps (a) to (e) lay the preformed semi-spars 2 (FIG. 12) and consisting of the fiber impregnation with the synthetic resin material. Performing consists in applying a vacuum and temperature so that the pre-impregnated material takes a predetermined shape without going through a polymerization process.

(g) Onto each plate 4 and 8 which close the shaping tool, lay the layers of pre-impregnated material of the lower and upper skins 3 and 19.

(h) Set the supporting elements with related preformed spars onto the lower plate 4.

(i) Put the fillers 1 into position.

(j) On the top of the assembly, set the upper half shell 8 with its layers of pre-impregnated material 19.

(k) On top of all the above, lay the sheet separator agent 18 and breathing material 17.

(l) Over all the above, lay bag film 16 and seal the bag onto the base plate of the tool with sealant 15.

(m) Open the ends of each film of the tubular separator 13, cut the excess length with respect to the supporting element 7.

(n) Unwrap the ends of each of the tubes of tubular bag 11 and seal them at their ends with sealing agent 15.

(o) Prepare. the envelope bag by sealing the edge of the outer bag film 16 onto the base plate 4, the edge of the bag film, also indicated by 16, with the ends of internal tubular sacs 11, the ends of the tubular sacs near to each other.

(p) Apply vacuum valves 14 in the required quantities.

(q) Apply the vacuum until the external bag film 16 tightens onto the outer surface of the forming tool made of elements 4, 6, 8.

(r) Open the ends of each of the tubular sacs 11.

(s) Continue to apply vacuum. Tubular sacs 11 will separate from supporting elements 7, minimizing the volume closed in the envelope bag.

(t) Extract the supporting elements 7.

(u) Move the assembly to an autoclave or oven or other and apply the polymerization process.

Figure 11:
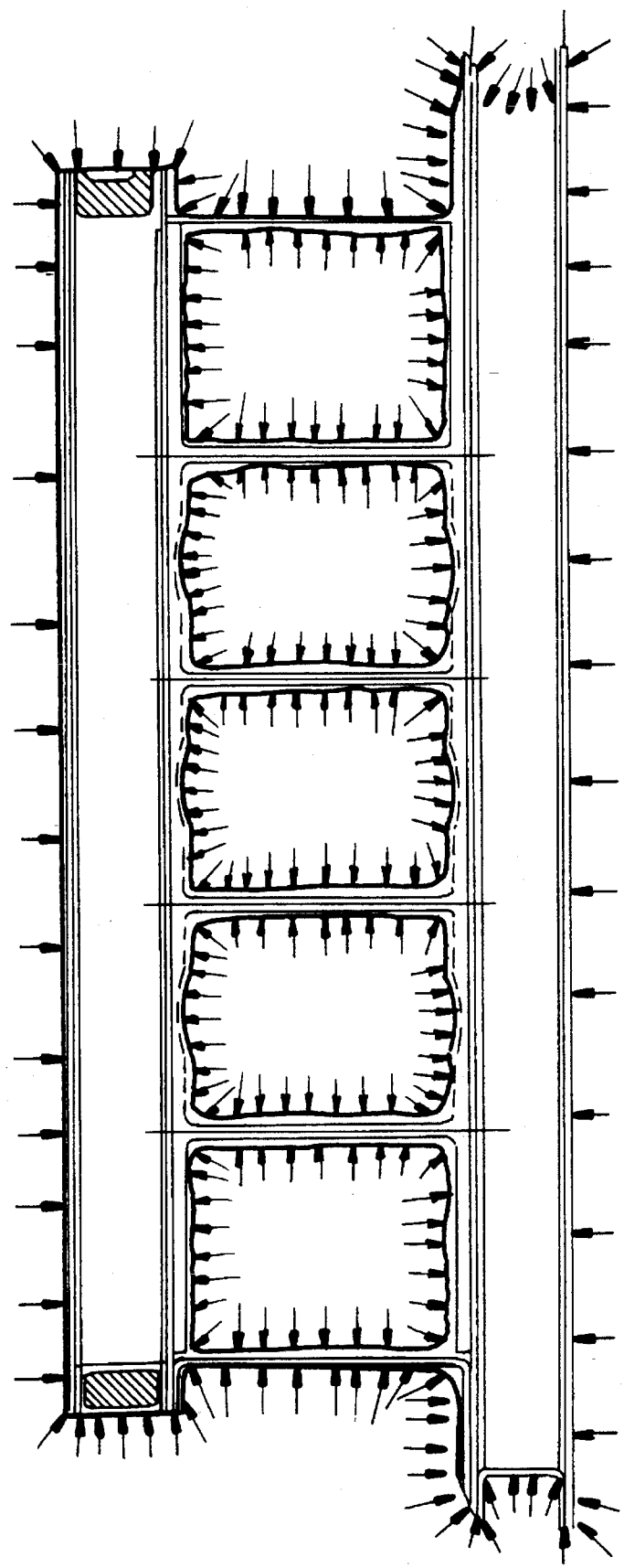
FIG. 11 is a diagram with FIG. 10 as the basis, illustrating pressure distribution upon the structure.

The process described till now and its related equipment serve to:

position the preformed bars correctly and keep them in this position throughout the closing of the tool and the preparation of the envelope bag; and during the polymerization process, apply the compacting pressure uniformly over the surface of the component as shown in FIG. 11.

More particularly, with respect to the materials used, the material stored in the refrigerator and preimpregnated with the polymerizable material can consist of a mat, nonwoven fabric, knit or woven fabric of carbon fibers, boron fibers or glass fibers impregnated with a thermosetting resin such as an epoxy resin. The shoulder 6 can be composed of metal, fiberglass or a synthetic resin material resistant to the autoclaving temperatures and the fastening means 5 can be screws or bolts which can be removable and can secure the flanges of the shoulders 6 to the plates 4 and/or 8. The separating materials such as the separator 10 or 18 can be composed of Teflon foil or a Teflon coated or impregnated sheet material, e.g. polyethylene.

The tubular bag 11 and the bag material 16 maybe polyethylene or polypropylene film. The sealant 15 may be any adhesive capable of bonding to polyethylene or polypropylene as may be the case, although it can also represent a heat seal where appropriate.

The breathing material 12 or 17 can include any nonwoven or fleece like mat of a synthetic resin fiber, such as a polyester, a loosely woven fabric or like porous material.

The tubular film 13 may also be either polypropylene or polyethylene as desired. The filler 1 maybe a reinforcing cord of aramide fiber or the like. The temperature at which the autoclave operates can be any appropriate temperature for polymerization of the epoxy resin, for example, and the duration of the polymerization treatment should be sufficient to insure full polymerization of the composite material from which the spars 2 and the upper and lower skins 19 and 3 are formed.

I claim:

1. A method of manufacturing of fiber structures comprising the steps of:

removing a polymeric matrix material reinforced by carbon, aramid or glass fibers from a refrigerator;

cutting the material to fit onto a shaping tool having supporting elements;

dressing each of the supporting elements with a layer of a parting film and then applying a tubular bag to each of the supporting elements leaving an excess on each side;

wrapping each supporting element over the tubular bag with the cut material and fixing edges of the cut material with adhesive tape;

dressing each supporting element having said layer of parting film, said tubular bag, and said cut material thereon with a tubular parting film leaving an excess at each end;

sealing the ends of each tubular film using sealing agent and applying a vacuum forming valve to each end of the tubular film;

applying a vacuum to said tubular film and causing the tubular parting film to tighten against the supporting element;

on each supporting element thereafter positioning preformed spars which act as strengthening elements;

on each plate of a forming tool, positioning respective layers of said material to form upper and lower skins;

positioning the supporting elements with the spars on a lower one of the plates;

positioning fillers between the plates;

positioning an upper one of said plates on the supporting elements on spars on the lower one of the plates to form an assembly;

covering the assembly with parting film sheets and said material;

covering the assembly with bag film to form an outer bag and sealing the outer bag to a base plate of the tool with sealing agent;

opening the ends of each of the parting film tubes, cutting an excess to the length of the supporting elements;

unwrapping the ends of the tubular sacs;

forming an envelope bag by sealing the edge of the outer bag onto the base plate and the edge of the bag film with the ends of the internal tubular sacs;

applying a vacuum until the external bag tightens onto the external surface of the forming tool; and carrying the assembly into an autoclave or oven to cause polymerization of the matrix material.

2. A method of making an integral composite box structure, comprising the steps of:

a) forming around respective elongated supports and successively outwardly therefrom, parting film layers, respective closed bags of film, respective layers of a breathing material, and respective additional parting film layers to produce a plurality of support assemblies;

b) disposing on a lower plate of a forming tool a lower skin of a thermosetting polymerizable fiber reinforced material;

c) fitting around said assemblies pairs of preformed spars of said material and positioning said assemblies with the spars preformed thereon upon said lower skin;

d) applying an upper skin of said material to said spars on said assemblies;

e) positioning an upper plate of said forming tool on said upper skin;

f) enclosing said upper plate and said assemblies in a bag foil and opening said bags of film and bonding same to said foil to form a bag enclosure closely surrounding all surfaces of said material except where said material contacts said plates;

g) evacuating said enclosure to apply uniform pressure to said material; and h) heating said material to effect polymerization thereof.

3. The method defined in claim 2 wherein said supports are removed from said bags upon the opening thereof.

4. The method defined in claim 3 wherein said bags are evacuated upon application to said supports to cause said bags to fit closely around said supports.

* * * * *